(12) United States Patent
Okada

(10) Patent No.: US 9,972,452 B2
(45) Date of Patent: May 15, 2018

(54) ROTARY SWITCH DEVICE

(71) Applicant: ALPHA CORPORATION, Yokohama-shi, Kanagawa (JP)

(72) Inventor: Takahiro Okada, Kanagawa (JP)

(73) Assignee: ALPHA CORPORATION, Yokohama-shi, Kanagawa (JP)

( * ) Notice: Subject to any disclaimer, the term of this patent is extended or adjusted under 35 U.S.C. 154(b) by 0 days. days.

(21) Appl. No.: 15/332,002

(22) Filed: Oct. 24, 2016

(65) Prior Publication Data

US 2017/0040125 A1    Feb. 9, 2017

Related U.S. Application Data

(63) Continuation of application No. PCT/JP2015/062451, filed on Apr. 23, 2015.

(30) Foreign Application Priority Data

Apr. 25, 2014    (JP) ................. 2014-091444

(51) Int. Cl.
*H01H 3/08* (2006.01)
*H01H 19/00* (2006.01)
(Continued)

(52) U.S. Cl.
CPC ............ *H01H 1/06* (2013.01); *B60R 16/02* (2013.01); *B60R 25/021* (2013.01); *H01H 1/36* (2013.01); *H01H 19/02* (2013.01)

(58) Field of Classification Search
CPC ............ H01H 1/00; H01H 1/02; H01H 1/021; H01H 1/023; H01H 1/06; H01H 1/12; H01H 1/14; H01H 1/16; H01H 1/18; H01H 2003/02; H01H 2003/12; H01H 2201/004; H01H 2205/00; H01H 2205/002; H01H 2205/004; H01H 2221/01; H01H 2223/01; H01H 2223/012; H01H 2223/028;
(Continued)

(56) References Cited

U.S. PATENT DOCUMENTS 2,195,307 A * 3/1940 Hensel ................ C22C 5/06
419/58
5,960,939 A * 10/1999 Miki ................. H01H 1/365
200/11 J
6,114,638 A   9/2000 Naganuma et al.

FOREIGN PATENT DOCUMENTS

JP    S64-89222 A    4/1989
JP    H07-245040 A   9/1995
(Continued)

*Primary Examiner* — Anthony R. Jimenez
(74) *Attorney, Agent, or Firm* — Drinker Biddle & Reath LLP

(57) ABSTRACT

A rotary switch device includes a fixed contact point part and a movable contact point part. The movable contact point part is rotated on the fixed contact point part so as to connect and disconnect the fixed contact point part and the movable contact point part. The fixed contact point part and the movable contact point part have contact surfaces which are band shapes and to which corrosion-resistant conductive processing is applied. A transient contact region, in which a contact point is moved from one end portion to the other end portion in a predetermined connection-operation angle from a contact start point with respect to the other of the fixed contact point part and the movable contact point part, is provided on each of the contact surfaces.

7 Claims, 5 Drawing Sheets

(51) Int. Cl.
*H01H 19/14* (2006.01)
*H01H 1/06* (2006.01)
*B60R 25/021* (2013.01)
*B60R 16/02* (2006.01)
*H01H 1/36* (2006.01)
*H01H 19/02* (2006.01)

(58) Field of Classification Search
CPC ....... H01H 2231/012; H01H 2231/016; H01H 9/00; H01H 19/02; H01H 2003/0293; H01H 2239/066; H01H 3/00; H01H 3/02; H01H 3/08; H01H 3/54; H01H 13/00; H01H 13/14; H01H 13/22; H01H 13/26; H01H 13/50; H03K 2217/94073; H03K 2217/96066; H03K 17/962; H03K 17/975

USPC ...... 200/5 A, 11 R, 5 E, 13, 14, 11 C, 19.07, 200/19.08, 19.18, 296, 336, 564, 565, 200/567, 569, 573, 245, 11 DA, 11 G, 200/11 TW, 19.01, 19.06, 19, 557

See application file for complete search history.

(56) References Cited

FOREIGN PATENT DOCUMENTS

| | | |
|---|---|---|
| JP | H09-147673 A | 6/1997 |
| JP | H10-125178 A | 5/1998 |
| JP | H11-176271 A | 7/1999 |
| JP | H11-238434 A | 8/1999 |
| JP | H11-260193 A | 9/1999 |
| JP | 2003-242858 A | 8/2003 |

* cited by examiner

ROTARY SWITCH DEVICE

CROSS REFERENCE TO RELATED APPLICATIONS

This application is a continuation of PCT application No. PCT/JP2015/062451, which was filed on Apr. 23, 2015 based on Japanese Patent Application (No. 2014-091444) filed on Apr. 25, 2014, the contents of which are incorporated herein by reference.

BACKGROUND OF THE INVENTION

Field of the Invention

The present disclosure relates to a rotary switch device.

Description of Related Art

In the related art, Patent Literature 1 discloses a rotary switch device in which a movable contact point part is short-circuited to a fixed contact point part by being rotationally operated and connection and disconnection of the switch are performed. The rotary switch device is configured as a high current specification and both contact points are formed of a conductive metal such as plating-free copper alloy considering arc discharge during contact start. Oxide films generated on contact surfaces are peeled by causing the contact surfaces to slidingly come in contact with each other with high contact pressure and thereby the contact points are held to be clean and contact failure can be prevented.

On the other hand, in such a high current contact point, predetermined mechanical properties are required to reduce wear due to the sliding contact with high contact pressure. Therefore, there is a tendency that the contact resistance is increased and the high current contact point is not suitable for low current as it is.

Since contact points of a low current specification reduce the contact resistance with low contact pressure and cannot expect a cleaning operation of the contact surfaces due to high contact pressure, corrosion-resistant conductive plating is applied on the surface. In a case where the contact points of the low current specification are used for the high current, damage of a plating film occurs due to arc discharging. Therefore, the contact points of the low current specification cannot be used for the high current.

[Patent Literature 1] JP-A-11-238434

SUMMARY

This present disclosure relates to a rotary switch device that is able to be used in both a high current and a low current.

DETAILED DESCRIPTION

Hereinafter, embodiments will be described with reference to the drawings. Accompanying drawings and the following disclosure are illustrative of the invention and are not intended to limit the subject described in the claims.

Figure 1:
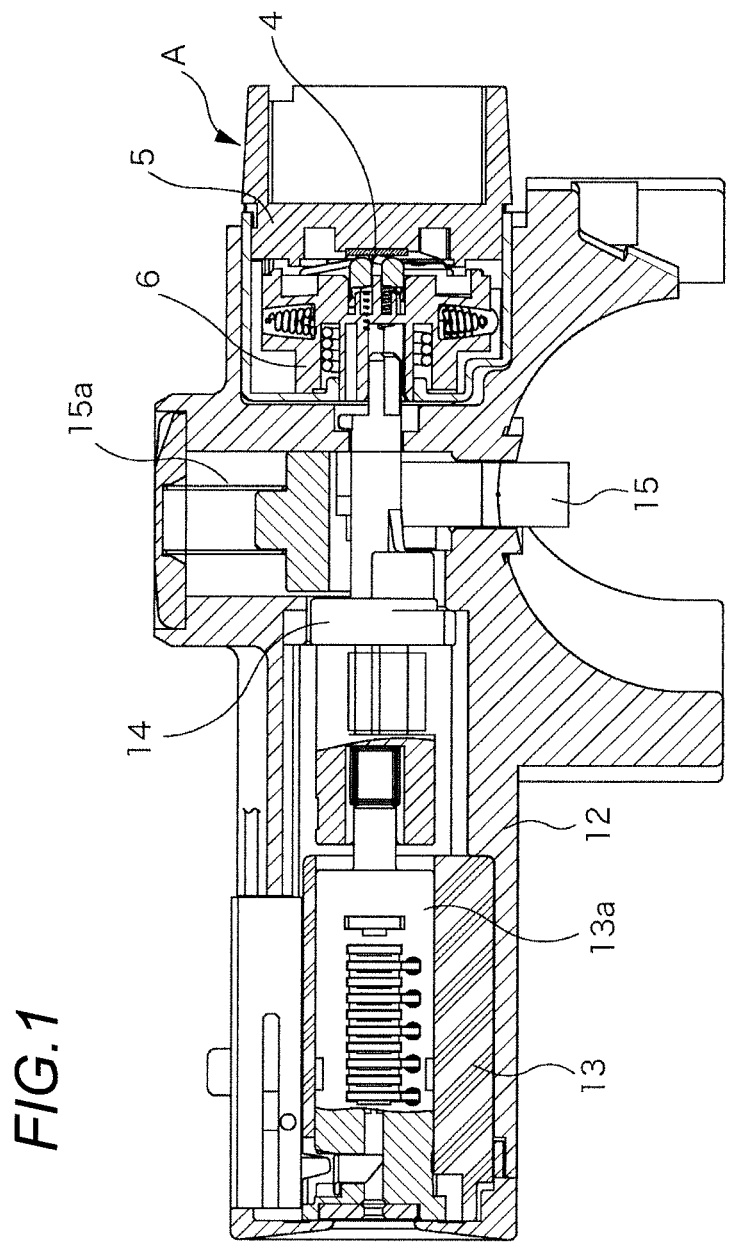
FIG. 1 is a sectional view illustrating a steering lock device.

A rotary switch configured as an ignition switch for use in a steering lock device is illustrated in FIG. 1 or below. The steering lock device of the example has a cylinder lock 13 housed within a housing 12 and a cam member 14 connected to an end of a plug 13a of the cylinder lock 13, and is fixed to a steering column (not illustrated).

A lock piece 15, which is moved between a lock position in which the lock piece 15 protrudes into the steering column by being moved forward and backward in a direction orthogonal to a rotational axis direction of the cam member 14 and an unlock position in which the lock piece 15 is housed within the housing, is mounted on the housing 12. The lock piece 15 is biased by a compression spring 15a in a direction of the lock position. If the plug 13a is operated to rotate from a lock rotational position, the lock piece 15 is moved from the lock position to the unlock position and is able to be operated to a steering shaft.

An ignition switch (A), which conducts electricity between predetermined contact points and changes a power supply state to an electrical system of a vehicle by the rotation of the plug 13a, is connected to an end of the cam member 14.

Figure 2A:
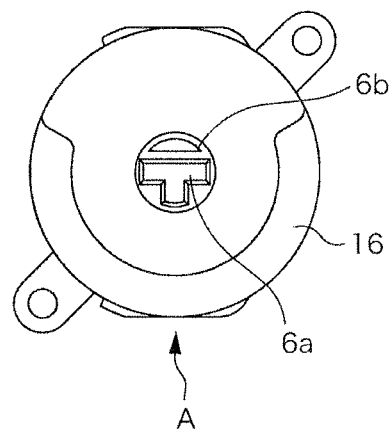
FIG. 2A is a plan view of a rotary switch device.
Figure 2B:
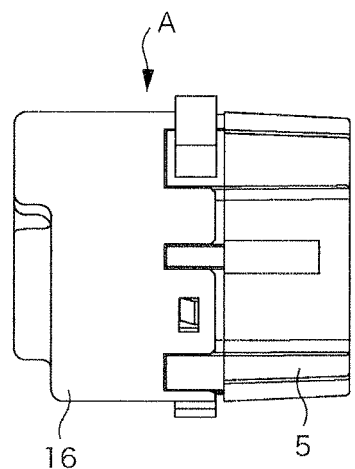
FIG. 2B is a side view of the rotary switch device.
Figure 2C:
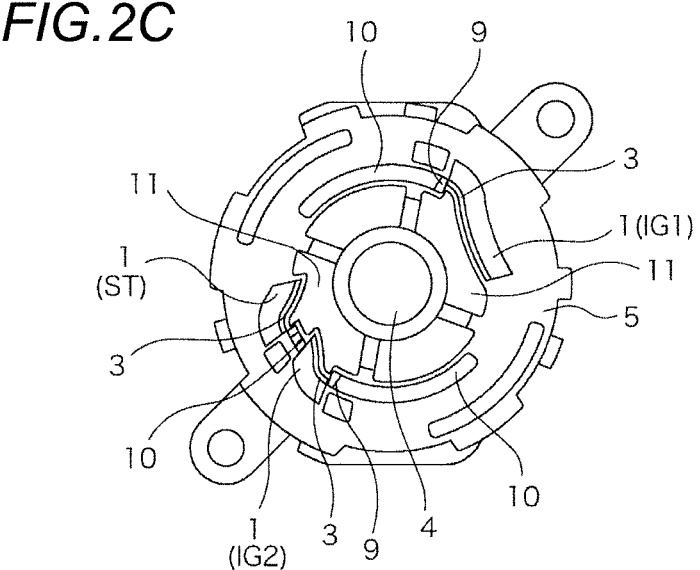
FIG. 2C is a view illustrating one surface of a fixed contact point part of a switch case.
Figure 3:
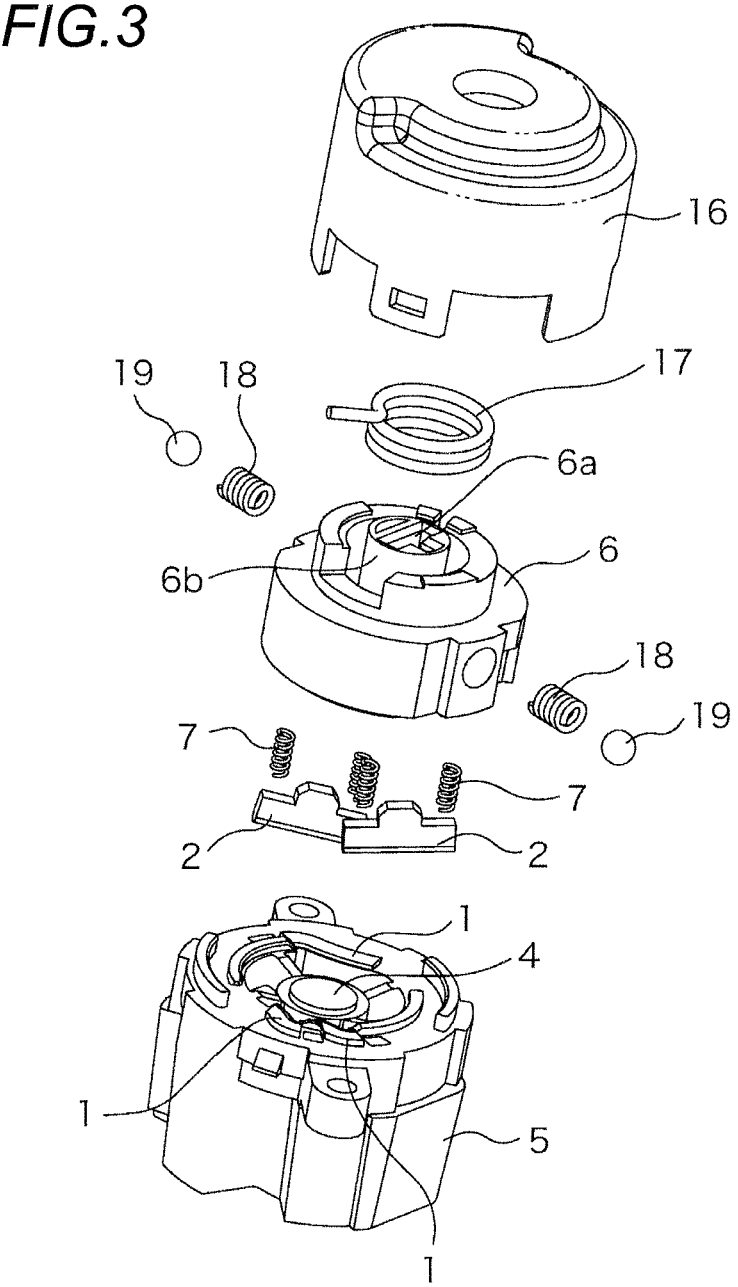
FIG. 3 is an exploded perspective view of the rotary switch device.

The ignition switch (A) has, as illustrated in FIGS. 2(a) to 3, a switch case 5, a contact point holder 6 that is rotatable around a rotational center with respect to the switch case 5, and a switch cover 16 that is connected to the switch case 5 and covers the contact point holder 6. A circular power supply terminal 4 and fixed contact point parts 1 are disposed in the switch case 5 that is formed in a columnar shape by an insulating material in a state of being exposed to rotary interface with the contact point holder 6.

As illustrated in FIG. 3, the contact point holder 6 includes a plug connecting portion 6b having a connecting hole 6a to the cam member 14 in one end portion. The contact point holder 6 is biased in an initial rotational position by a torsion spring 17. In addition, the contact point holder 6 is moderately rotated at an appropriate connection operation angle by pressing click balls 19, which are biased by click springs 18, against an inner wall of the switch case 5.

Furthermore, planar movable contact point parts 2 having a predetermined thickness are housed in the contact point holder 6 in a manner in which plate thickness surfaces face the switch case 5. As described below, the movable contact point part 2 is movable in the rotational axis direction and is biased on a surface side of the switch case 5 by compression springs 7 housed in the contact point holder 6.

As illustrated in FIG. 2C, the power supply terminal 4 is connected to a power supply (not illustrated) and is disposed in a center portion of the switch case 5, that is, in a rotational center position of the contact point holder 6. In addition, silver plating is applied to the fixed contact point part 1 for preventing corrosion on the surface, is formed in an elongated band shape, and is disposed so as to surround a periphery of the power supply terminal 4. Silver plating is applied to a surface of the movable contact point part 2 held in the contact point holder 6 and the movable contact point part 2 is disposed to bridge the power supply terminal 4 and the fixed contact point part 1. As illustrated in FIGS. 4(*a*) to 4(*d*), the movable contact point part 2 is connected to the power supply terminal 4 by always being pressed against the power supply terminal 4 at any rotational position by being biased by the compression springs 7, and, furthermore, in order to prevent occurrence of abrasion of the fixed contact point part 1 when the movable contact point part 2 moves on the fixed contact point part 1, a contact surface of the movable contact point part 2 with the fixed contact point part 1 is formed as a curvature surface (see FIG. 5D).

In the example in which the movable contact point part 2 is shifted by being rotated from "OFF state" to "ON state" in the clockwise direction, as illustrated in FIG. 2C, a raised protrusion 10 extending from a connection start point of each fixed contact point part 1 in the counterclockwise direction is provided in the switch case 5. An inclined surface 9, which is a profile gradually decreases toward a distal end, is provided in an end region of the raised protrusion 10.

In addition, the fixed contact point part 1 is formed by providing the transient contact region 3 in front of a contact position of the movable contact point part 2 in the connection-operation angle described above. The transient contact region 3 is configured so as to be disposed in an inclined shape gradually toward the rotational center of the contact point holder 6 while going from the contact start point with the movable contact point part 2 to the contact position in the connection-operation angle.

Figure 5A:
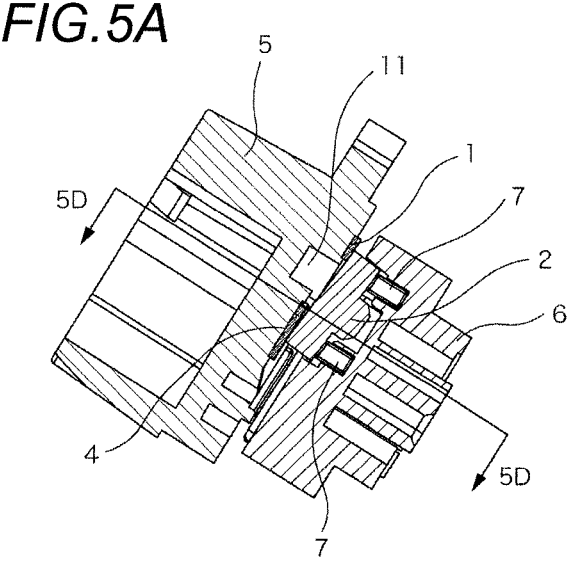
FIG. 5A is a sectional view that is taken along line 5A-5A of FIG. 4B.
Figure 5B:
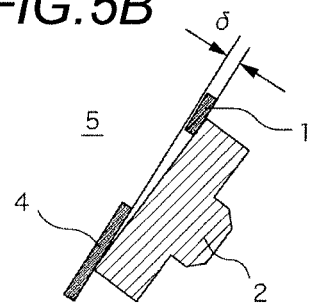
FIG. 5B is an enlarged view of a main portion of FIG. 5A.
Figure 5C:
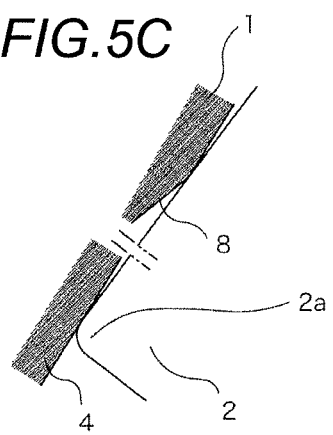
FIG. 5C is a view further enlarging a main portion of FIG. 5B.

Furthermore, as illustrated in FIG. 5C, side edges on the rotational center of the fixed contact point part 1 are chamfered and the movable contact point part 2 of which one end is pressed against a power supply electrode is conductive by being in contact with a ridge line of the chamfered portion 8.

As illustrated in FIG. 5B, the fixed contact point part 1 is disposed in a position (height difference δ) higher than a surface on which the power supply electrode is provided so that the movable contact point part 2 comes into contact with the ridge line of the chamfered portion 8. In order to prevent sharp contact with the power supply electrode by the inclination due to the height difference, a round chamfered portion 2*a* is formed in a corner portion of the movable contact point part 2 on the power supply electrode side (see FIG. 5C).

Figure 4A:
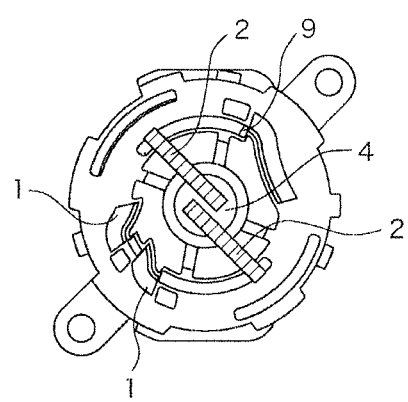
FIG. 4A is a view illustrating a non-conductive state of the rotary switch device.
Figure 4B:
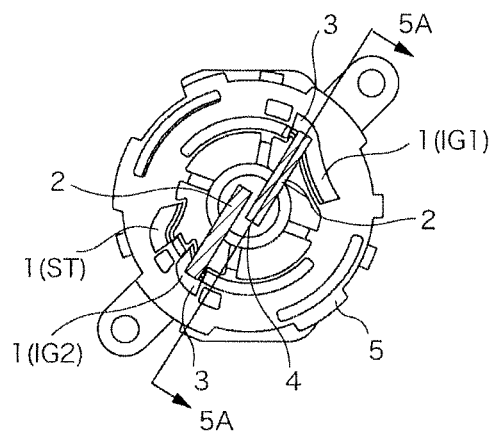
FIG. 4B is a view illustrating a state immediately after an IGN1 fixed contact point part and an IGN2 fixed contact point part are connected to a power supply terminal.
Figure 5D:
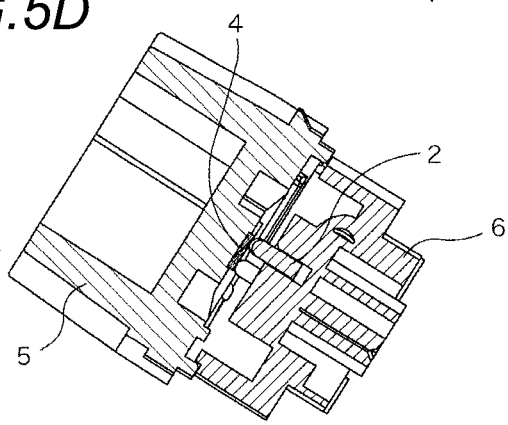
FIG. 5D is a sectional view that is taken along line 5D-5D of FIG. 5A.

Therefore, in the example, if the contact point holder 6 is rotated from the non-conductive state illustrated in FIG. 4A in the clockwise direction, the movable contact point part 2 is moved on the raised protrusion 10 formed in the switch case 5 and, as illustrated in FIG. 4B, lands on the contact start point of the fixed contact point part 1 via the inclined surface 9. Power feeding is started to the corresponding fixed contact point parts 1 (IG1 terminal, and IG2 terminal in the example) by causing the movable contact point parts 2 to come into contact with the fixed contact point parts 1.

Thereafter, furthermore, if the movable contact point part 2 is operated to be rotated to the connection-operation angle described above, the contact point of the movable contact point part 2 with the fixed contact point part 1 is sequentially moved and the contact point of the fixed contact point part 1 with the movable contact point part 2 is also sequentially moved on the contact point side of the power supply terminal 4. As a result, particularly, even if the contact point is used for the high current and arc discharging occurs, a clean contact state is always obtained in the connection-operation angle illustrated in FIG. 4C.

Figure 4C:
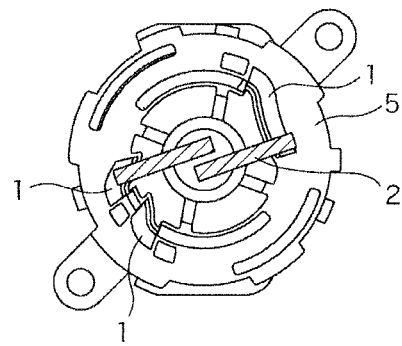
FIG. 4C is a view illustrating a state where the IGN1 fixed contact point part and an ST fixed contact point part are connected to the power supply terminal.
Figure 4D:
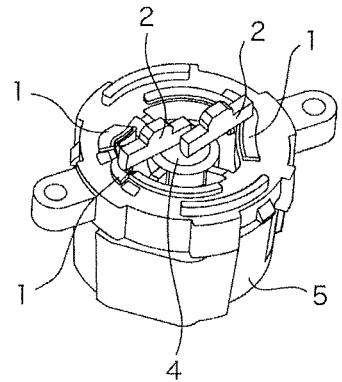
FIG. 4D is a perspective view of FIG. 4B.

FIG. 4C illustrates the contact state of the contact point when the movable contact point part is operated to be rotated to the connection-operation angle of the IG1 terminal and the ST terminal.

In addition, as illustrated in FIG. 2C, in an initial stage of the transient contact region 3, that is, the vicinity of the contact start point of the fixed contact point part 1, the inclined angle is smaller than that of the subsequent region. Therefore, a relative moving speed of the fixed contact point part 1 on the movable contact point part 2 is reduced, an arc discharging region on the fixed contact point part 1 is limited, and a clean contact state is ensured in the connection-operation angle.

Furthermore, as described above, one end of the movable contact point part 2 is supported on the power supply terminal 4 and the movable contact point part 2 comes into contact with the chamfered portion 8 of the fixed contact point part 1. Therefore, in a case where the contact point is worn, the contact point is sequentially moved in the direction of the power supply terminal 4 and a clean contact state is always ensured.

According to the embodiment, a rotary switch device includes fixed contact point part 1 and movable contact point part 2. The movable contact point part 2 is rotated on the fixed contact point part 1 so as to connect and disconnect the fixed contact point part 1 and the movable contact point part 2. The fixed contact point part 1 and the movable contact point part 2 have contact surfaces which are band shapes and to which corrosion-resistant conductive processing is applied. A transient contact region 3, in which a contact point is moved from one end portion to the other end portion in a predetermined connection-operation angle from a contact start point with respect to the other of the fixed contact point part and the movable contact point part, is provided on each of the contact surfaces.

Corrosion of the contact surfaces of the fixed contact point parts 1 and the movable contact point parts 2 of the rotary switch device is prevented. The contact surfaces are held clean without depending on a cleaning operation by sliding at high contact pressure. Therefore, even if the contact point is used for the low current, corrosion does not occur on the contact surfaces and the occurrence of contact failure due to the occurrence of the insulating film can be prevented.

In addition, both contact points are formed in the elongated band shape and both contact points are moved from one end portion to the other end portion together with the rotation of the movable contact point part 2. Therefore, even if damage of the film of the contact position occurs due to arc discharging, a clean surface state is maintained in both contact surfaces in the connection-operation angle. Therefore, the contact failure does not occur.

A conductive processing surface for corrosion protection can be obtained by applying silver plating or applying clad processing and disc processing on the surface of the conductive member such as copper.

Therefore, the same structure may also be used for the high current. Thus, there is no need to set a plurality of types of the rotary switch devices for each regulated current.

The transient contact region 3 of the fixed contact point part 1 may be formed in a shape in which a moving speed on the movable contact point part 2 is a low speed in a vicinity of the contact start point.

The formation of the transient contact region 3 is able to be realized by moving the strip-like movable contact point part 2 on the strip-like fixed contact point part 1 that is disposed to be inclined so that the distance of the movable contact point part 2 to the rotational center is changed. If the inclination in the vicinity of the contact start point between the fixed contact point part 1 and the movable contact point part 2 is moderated, the moving speed of the contact point of the movable contact point part 2 with the fixed contact point part 1 is lowered when the movable contact point part 2 is operated to be rotated at a predetermined angular speed.

As described above, if a low speed moving region is provided in the initial stage of the contact of both electrodes, it is possible to limit a damage region of the contact portion on the movable contact point part 2 due to arc discharging to be a narrow region.

The transient contact region 3 of the fixed contact point part 1 may be formed in a shape in which a distance between the transient contact region and a rotational center of the movable contact point part 2 is the maximum in a vicinity of the contact start point.

In a case where the movable contact point part 2 is operated to be rotated at a predetermined angular speed, a peripheral speed of the movable contact point part 2 on the fixed contact point part 1 becomes the maximum in the contact start point in which the distance from the rotational center becomes the maximum. Therefore, a transit time becomes the minimum. As a result, a distance of the fixed electrode influenced by arc discharging becomes the minimum and it is possible to effectively prevent degradation of the electrode.

The rotary switch device may further include a switch case 5 that exposes the fixed contact point part 1 and a power supply terminal 4 toward a predetermined contact direction and holds the fixed contact point part 1 and the power supply terminal 4, and a contact point holder 6 that holds the movable contact point part rotatably around an axis along the contact direction and reciprocatably toward the contact direction. The movable contact point part is formed in a plate shape having a predetermined thickness. The movable contact point part 2 is always in contact with the power supply terminal 4 and is in contact with the fixed contact point part 1 during conduction with predetermined contact pressure by compression springs 7.

The movable contact point part 2 has a floating structure in which a biasing force is applied in a contact point pressure applying direction. Therefore, followability is increased with respect to the fixed contact point part 1, connection reliability is improved, and then the structure is simplified.

A chamfered portion 8 may be formed in a side edge of the fixed contact point part 1. The power supply terminal 4 and the fixed contact point part 1 may be disposed at different heights in the contact direction so as to hold the movable contact point part 2 in an inclined posture and the movable contact point part 2 may be in contact with ridge lines of the chamfered portion 8 of the fixed contact point part 1 to be conductive.

The chamfered portions are formed in the side edges of the fixed contact point parts 1 and the movable contact point parts 2 of the floating state come into line contact with the ridge lines of the chamfered portions 8. Therefore, homogeneous contact quality is ensured in each moving point.

In addition, if the chamfered portion is formed in the fixed contact point part 1 and the movable contact point part 2 comes into contact with the ridge line, in a case where the fixed contact point part 1 is worn, since the contact point is moved corresponding to a wear amount, it is possible to always provide a clean contact point with respect to the movable contact point part 2.

Raised protrusions 10 of the movable contact point part 2, of which the contact start point of the fixed contact point part 1 is defined as an end points, and of which the end point is formed by an inclined surface 9, may be provided in the switch case 5.

The movable contact point part 2 rides the raised protrusion 10 in a non-contact rotation position and the contact start is performed by causing the entire surface of the contact surface of the movable contact point part 2 to gradually come into contact with the fixed contact point part 1 while coming down the inclined surface 9 formed in the end point of the raised protrusion 10. In a case where the movable contact point part 2 starts the contact on the same plane, an end edge of the fixed contact point part 1 is the connection start point, discharge concentration occurs due to an edge effect, and damage of the contact point is increased. However, in a case where the raised protrusion 10 is present, the contact start is performed in a state where the movable contact point part 2 lands on the fixed contact point part 1. Therefore, it is possible to reduce the damage of the contact point due to the edge effect.

The buffering recessed portions 11 separating the fixed contact point part 1 and the power supply terminal 4 may be provided in the switch case 5.

The buffering recessed portions 11 provided between the fixed contact point parts 1 and the power supply terminal 4 are a storage space of particles and the like due to arc discharging and then become buffering bands which prevents deposition of conductive particles between the fixed contact point parts 1 and the power supply terminal 4 in a continuous shape. Therefore, a continuous conductive particle layer is formed between the fixed contact point parts 1 and the power supply terminal 4, and short-circuit is prevented between the fixed terminal and the power supply terminal 4.

According to the disclosure, it is possible to obtain the rotary switch device which is able to be used for both the high current and the low current.

DESCRIPTION OF REFERENCE NUMERALS AND SIGNS 1 fixed contact point part
2 movable contact point part
3 transient contact region
4 power supply terminal
5 switch case
6 contact point holder
7 compression spring
8 chamfered portion
9 inclined surface
10 raised protrusion
11 buffering recessed portion

What is claimed is:
1. A rotary switch device comprising:
a fixed contact point part; and
a movable contact point part,
wherein the movable contact point part is rotated on the fixed contact point part so as to connect and disconnect the fixed contact point part and the movable contact point part,
wherein the fixed contact point part and the movable contact point part have contact surfaces which are band shapes and to which corrosion-resistant conductive processing is applied, wherein a transient contact region, in which a contact point is moved from one end portion to another end portion in a predetermined connection-operation angle from a contact start point with respect to the fixed contact point part and the movable contact point part, is provided on each of the contact surfaces, and wherein the transient contact region is disposed in an inclined shape gradually toward a rotational center of a contact point holder.

2. The rotary switch device according to claim 1, wherein the transient contact region of the fixed contact point part is formed in a shape in which a moving speed of the contact point part in a vicinity of the contact start point is lower than a moving speed in another contact area when the movable contact point part is operated to be rotated at a predetermined angular speed.

3. The rotary switch device according to claim 1, wherein the transient contact region of the fixed contact point part is formed in a shape in which a distance between the transient contact region and a rotational center of the movable contact point part is a maximum at the contact start point.

4. The rotary switch device according to claim 1, further comprising:

a switch case that exposes the fixed contact point part and a power supply terminal toward a predetermined contact direction and holds the fixed contact point part and the power supply terminal; and the contact point holder that holds the movable contact point part to rotate around an axis along the contact direction and to reciprocate toward the contact direction, wherein the movable contact point part is formed in a plate shape having a predetermined thickness, and wherein the movable contact point part is always in contact with the power supply terminal and is in contact with the fixed contact point part during conduction with a predetermined contact pressure by a compression spring.

5. The rotary switch device according to claim 4, wherein a chamfered portion is formed in a side edge of the fixed contact point part, and wherein the power supply terminal and the fixed contact point part are disposed at different heights in the contact direction so as to hold the movable contact point part in an inclined posture and the movable contact point part is in contact with a ridge line of the chamfered portion of the fixed contact point part to be conductive.

6. The rotary switch device according to claim 4, wherein a raised protrusion of the movable contact point part, of which the contact start point of the fixed contact point part is defined as an end point, and of which the end point is formed by an inclined surface, is provided in the switch case.

7. The rotary switch device according to claim 4, wherein a buffering recessed portion separating the fixed contact point part and the power supply terminal is provided in the switch case.

* * * * *